United States Patent [19]

Browder

[11] 4,341,986
[45] Jul. 27, 1982

[54] SERVO CONTROL SYSTEM FOR THE POSITIONING OF AN APPARATUS

[75] Inventor: George B. Browder, Winter Garden, Fla.

[73] Assignee: The United States of America as represented by the Secretary of the Navy, Washington, D.C.

[21] Appl. No.: 227,311

[22] Filed: Jan. 22, 1981

[51] Int. Cl.$^3$ .............................................. G05B 5/01
[52] U.S. Cl. .................................... 318/618; 318/621; 318/604; 318/561
[58] Field of Search ............... 318/615, 616, 617, 618, 318/621, 622, 604, 561; 364/460

[56] References Cited

U.S. PATENT DOCUMENTS

| | | | |
|---|---|---|---|
| 3,465,276 | 9/1969 | Silva et al. ...................... | 318/621 X |
| 3,539,897 | 11/1970 | Sommeria ....................... | 318/616 X |
| 3,748,565 | 7/1973 | Wilson et al. .................... | 318/621 X |
| 3,758,762 | 9/1973 | Littman et al. .................. | 318/561 X |

Primary Examiner—B. Dobeck
Attorney, Agent, or Firm—Robert F. Beers; Robert W. Adams; David S. Kalmbaugh

[57] ABSTRACT

A servo control system for the positioning of a projector comprising a direct current motor having the projector connected to the shaft of the motor, and a digital computer for providing command signals to move the projector to a programmed position at a programmed velocity within a predetermined time period. A potentiometer produced an electrical signal indicative of the actual position of the projector, and a tachometer produces an electrical signal indicative of the actual velocity of the projector. Feedback means, in turn, provides a position error signal indicative of the difference between the programmed position and the actual position of the projector, provides a velocity error signal indicative of the difference between the programmed velocity and the actual velocity of the projector, and varies, in response to the position and velocity error signals, the voltage level of the command signal such that the projector will attain the programmed position within the predetermined time period. A forward feed servo enhancer generates, in response to the command signals, a forward feed enhancement signal which when combined with the command signals will reduce the velocity error signal to approximately zero volts. This, in turn, allows the direct current motor, and thus the projector to respond to command signals at frequency rates not to exceed a predetermined frequency.

10 Claims, 5 Drawing Figures

SERVO CONTROL SYSTEM FOR THE POSITIONING OF AN APPARATUS

BACKGROUND OF THE INVENTION

1. Field of the Invention

This invention relates generally to position loop control systems. In particular, this invention relates to a position loop control system for controlling a direct current motor which, in turn, controls the positioning of a projector.

2. Description of the Prior Art

Relative motion of an object along a predetermined path of travel according to a predetermined velocity profile and its positioning at a predetermined relative position has conventionally been controlled by circuitry employing a position potentiometer for indicating the position of the object and a tachometer for measuring the velocity of the object. The tachometer velocity is compared with a desired velocity to control the motion of the object in a closed loop servo system. The final position is, in turn, maintained at the end of the motion of the object by a closed loop servo system in response to the output of the position potentiometer.

U.S. Pat. No. 3,539,897 to Marcel R. Sommeria is the closest known prior art to the subject invention. Disclosed therein is a servo control system which may be utilized in combination with numerical control apparatus for machine tools. The servo control system responds to an input signal comprising a train of pulses, the separation of which is modulated to designate programmed movement of the machine. The servo control system, in turn, controls a servo drive apparatus in response to the frequency of the input pulse train, in addition to controlling the servo drive apparatus in accordance with the instantaneous position and velocity of the driven apparatus so that the lag between actual and programmed positions of the driven apparatus may be reduced with no system instability.

Unfortunately, the aforementioned devices of the prior art ordinarily leave something to be desired, especially from the standpoints of system instability, system accuracy, and complexity in design. Moreover, with respect to the former system accuracy and, hence, the positioning of the apparatus being controlled thereby is somewhat less than that desired in complex servo control systems, while the latter is complex, does not operate in exactly the same manner as the subject invention and contains a combination of elements that is somewhat different from that of the present invention.

SUMMARY OF THE INVENTION

The subject invention overcomes some of the disadvantages of the prior art, including those mentioned above, in that it comprises a relatively simple servo control system which may be utilized to control the positioning of a projector or other apparatus in response to command signals provided by a digital computer.

Included in the subject invention is a direct current motor which has the aforementioned projector connected thereto, and which in response to each command signal provided by the digital computer will move the projector to a programmed position at a programmed velocity within a predetermined time period. A potentiometer, connected to the shaft of the motor, produces an electrical signal indicative of the actual position of the motor, and a tachometer, connected to the shaft of the motor, produces an electrical signal indicative of the actual velocity of the motor. Feedback means, in turn, provides a position error signal indicative of the difference between the programmed position and the actual position of the projector. In addition, the aforementioned feedback means provides a velocity error signal indicative of the difference between the programmed velocity and the actual velocity of the projector, and varies, in response to the aforementioned position and velocity error signals, the voltage level of the command signal such that the projector will attain the programmed position within the predetermined time period.

A forward feed servo enhancer generates, in response to the command signals, a forward feed enhancement signal which when combined with each command signal will reduce the velocity error signal to approximately zero volts. This, in turn, allows the direct current motor, and thus the projector to respond to command signals at frequency rates not to exceed three hertz.

DESCRIPTION OF THE PREFERRED EMBODIMENT

Figure 1:
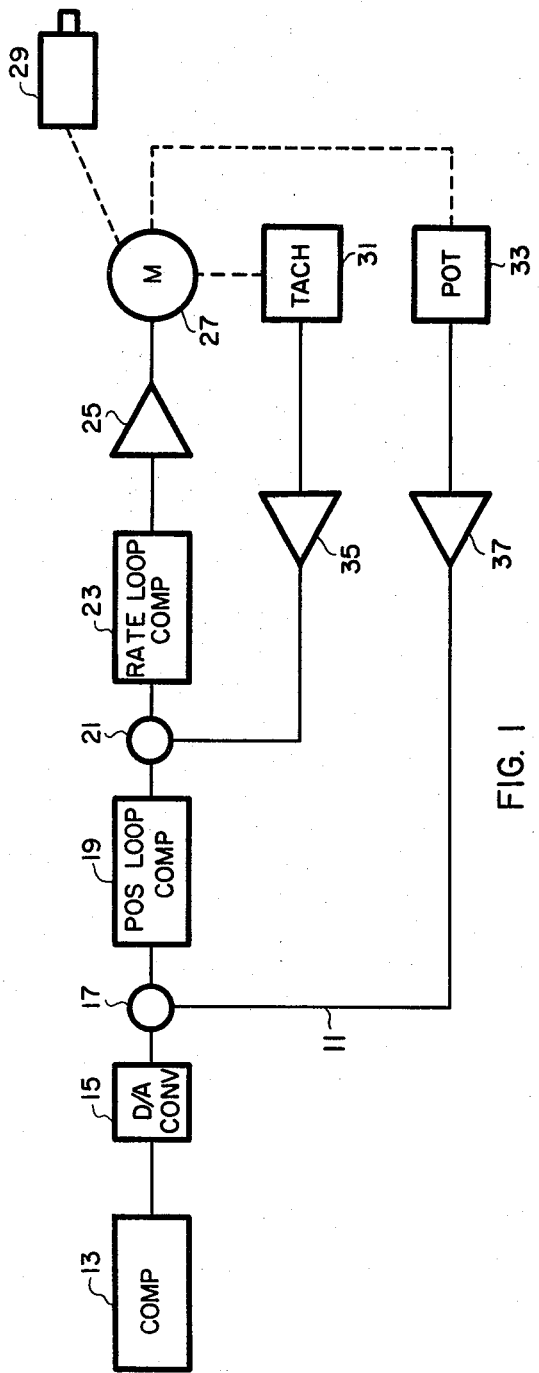
FIG. 1 is a functional block diagram of a servo control system which may be utilized to position a projector.

The preferred embodiment of the subject invention will now be discussed in some detail in conjunction with all of the figures of the drawing wherein like parts are designated by like reference numerals, insofar as it is possible and practicable to do so.

Referring first to FIG. 1, there is shown a servo control system 11 comprising a digital computer 13, the output of which is connected to the input of a digital-to-analog converter 15, with the output thereof connected to a summing junction 17. Summing junction 17 is connected to the input of a position loop compensator 19, the output of which is connected to a summing junction 21. Summing junction 21 is, in turn, connected to the input of a rate loop compensator 23, the output of which is connected to the input of a power amplifier 25, with the output thereof connected to the input of a direct current motor 27. Mechanically connected to the shaft of motor 27 are a projector 29, a tachometer 31, and a position potentiometer 33. It should be noted at this time that the mechanical connections among the components of FIGS. 1 and 2 are illustrated by dashed lines.

Referring again to FIG. 1, the output of tachometer 31 is connected to the input of a linear amplifier 35, the output of which is connected to summing junction 21. The output of potentiometer 33 is connected to the input of a linear amplifier 37, with the output thereof connected to summing junction 17.

At this time, it would be noteworthy to mention that all of the elements illustrated in FIG. 1 are conventional, well known in the art, and commercially available. Hence, a detailed description of these elements will not be included herein.

Figure 2:
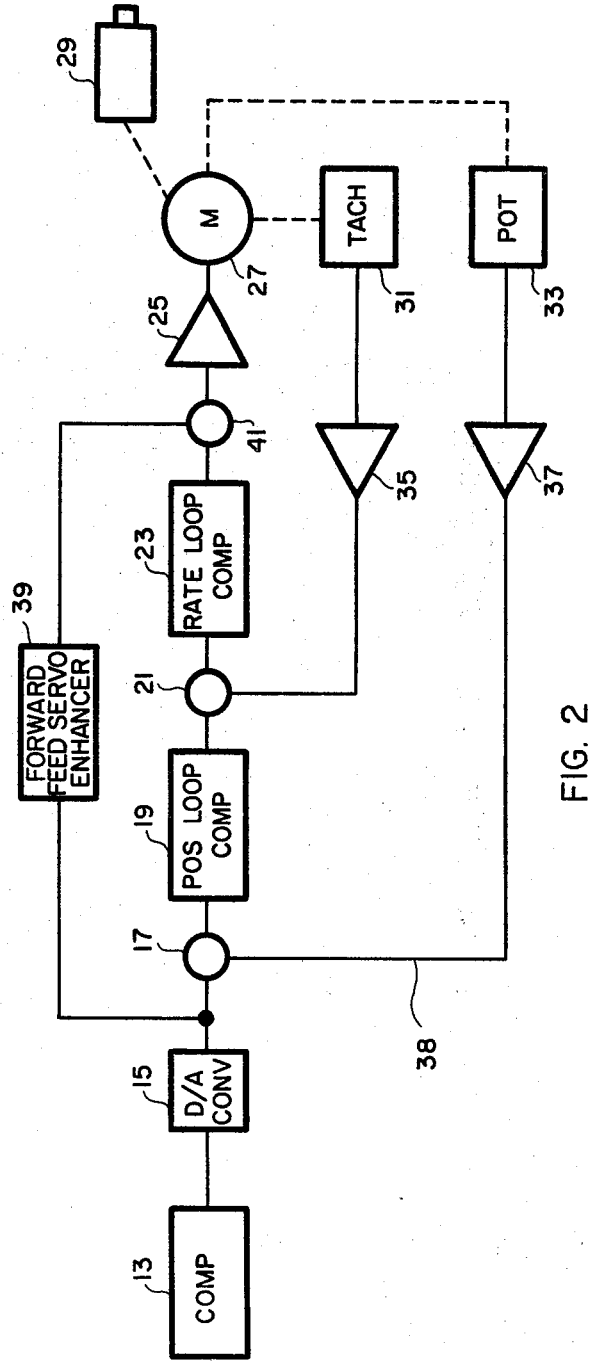
FIG. 2 is a functional block diagram of the servo control system constituting the subject invention which incorporates therein the control system of FIG. 1.

Referring now to FIG. 2, there is shown a servo control system 38 which is similar to that illustrated in FIG. 1. In addition to the elements of servo control system 11, FIG. 1, servo control system 38 has a forward feed servo enhancer circuit 39, the input of which is connected to the output of digital-to-analog converter 15, and the output of which is connected to a summing junction 41. Summing junction 41 is, in turn, connected between rate loop compensator 23 and power amplifier 25.

Figure 3:
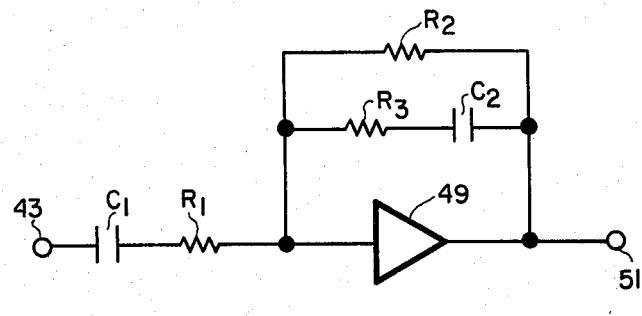
FIG. 3 is an electrical schematic diagram of the forward feed servo enhancer circuit of the invention of FIG. 2.

Referring now to FIG. 3, there is shown an electrical schematic diagram of forward feed servo enhancer circuit 39 of FIG. 2. Forward feed servo enhancer circuit 39, FIG. 2, includes a terminal 43 which is connected to the output of digital to analog converter 15, FIG. 2. Terminal 43 is, in turn, connected through the series combination of a capacitor $C_1$ and a resistor $R_1$ to the input of an operational amplifier 49, the output of which is connected to a terminal 51. Terminal 51 is then connected to summing junction 41, FIG. 2.

Connected between the input of amplifier 49, and the output of amplifier 49, in parallel, is a resistor $R_2$, and the series combination of a resistor $R_3$ and a capacitor $C_2$.

The operation of the subject invention will now be discussed in conjunction with all of the figures of the drawing.

Referring now to FIG. 1, digital computer 13 provides at the output thereof a digital command signal or digital word which controls the positioning of projector 29, such that projector 29 will move in an azimuthal direction to a programmed position at a programmed velocity within a predetermined time period. The digital command signal, which is a position signal having units of degrees, is then supplied to the input of digital-to-analog converter 15. Digital-to-analog converter 15, in turn, converts the aforementioned command signal to an analog command signal proportional thereto.

The analog command signal provided by digital-to-analog converter 15 is supplied through summing junction 17, position loop compensator 19, summing junction 21, and rate loop compensator 23 to the input of power amplifier 25, which amplifies the aforementioned analog signal so as to provide at the output thereof a motor drive signal.

The motor drive signal, in turn, activates motor 27 thereby rotating the shaft thereof so as to cause motor 27 to move projector 29 to the desired position in an azimuthal direction. Position potentiometer 33, in response to the rotational movement of the shaft of motor 27, produces at the output thereof an electrical signal which is indicative of the actual position of the shaft of motor 27, and thus the actual position of projector 29. Likewise, tachometer 31, in response to the rotational movement of the shaft of motor 27 produces at the output thereof an electrical signal which is indicative of the actual velocity of the shaft of motor 27, and thus the actual velocity of projector 29.

The electrical signal produced by position potentiometer 33 is supplied to amplifier 37, which amplifies the aforementioned electrical signal, and then supplies the amplified electrical signal to summing junction 17. Summing junction 17, in turn, provides a position error signal proportional to the difference between the programmed position of projector 29, as indicated by the command signal provided by digital computer 13, and the actual position of projector 29, as indicated by the electrical signal provided by position potentiometer 33.

The position error signal is then supplied to the input of position loop compensator 19. Position loop compensator 19 will then vary, in response to the aforementioned position error signal, the voltage level of the command signal provided by digital computer 13 such that the shaft of direct current motor 27 will continue to rotate until projector 29 is in the programmed position as determined by the command signal provided by digital computer 13. When the voltage level of the aforementioned command signal is equal to the voltage of the electrical signal provided by potentiometer 33, the position error signal will become zero volts, thereby inactivating motor 27 such that projector 29 will remain in the programmed position as determined by computer 13 until an additional command signal is provided by digital computer 13.

The electrical signal produced by tachometer 31 is supplied to amplifier 35 which amplifies the aforementioned electrical signal, and then supplies the amplified electrical signal to summing junction 21. Summing junction 21, in turn, provides a velocity error signal proportional to the difference between the programmed velocity of projector 29, as indicated by the command signal provided by digital computer 13, and the actual velocity of projector 29, as indicated by the electrical signal provided by tachometer 31.

The velocity error signal is then supplied to the input of rate loop compensator 23. Rate loop compensator 23, in turn, will vary the voltage level of the command signal provided by digital computer 13 in response to the aforementioned velocity error signal so as to cause the rotational speed or velocity of the shaft of motor 27 to vary such that projector 29 will attain the programmed position within the time period provided for by digital computer 13.

As mentioned above, when the voltage level of the command signal equals the voltage level of the electrical signal provided by potentiometer 33, motor 27 is inactivated. This, in turn, inactivates tachometer 31 such that the electrical signal provided thereby will attain a numerical value of zero volts and thus stabilize servo control system 11.

Referring now to FIGS. 2 and 3, digital computer 13 provides at the output thereof, as discussed above, a digital command signal or digital word which controls the positioning of projector 29. The digital command signal is then supplied to the input of digital-to-analog converter 15 which converts the aforementioned digital command signal to an analog command signal proportional thereto.

The analog command signal provided by digital-to-analog converter 15 is supplied through summing junction 17, position loop compensator 19, summing junction 21, and rate loop compensator 23 to summing junction 41.

Simultaneously, the analog command signal provided by digital-to-analog converter 15 is supplied to the input of forward feed servo enhancer 39, which has a transfer function in accordance with the following relationship:

$$P(s) = \frac{R_2(R_3 C_2 + 1) C_1 S}{[(R_2 + R_3)C_2 S + 1][R_1 C_1 S + 1]} \quad (1)$$

where P(s) is the transfer function for forward feed servo enhancer 39, and S is the frequency rate at which the command signals are produced by digital computer 13.

In forward feed servo enhancer 39 according to the subject invention, components and electrical values successfully utilized are as follows.

Resistors
 $R_1$—10K ohms
 $R_2$—9.419K ohms
 $R_3$—68K ohms
Capacitors
 $C_1$—6 mfd.
 $C_2$—0.02 mfd.

Substituting the aforementioned component values into relationship one above yields the following relationship.

$$P(s) = \frac{.0565S \left(\frac{S}{735} + 1\right)}{\left(\frac{S}{646} + 1\right)\left(\frac{S}{16.7} + 1\right)} \quad (2)$$

Figure 4:
FIG. 4 depicts an idealized representation of the output waveform signal of the forward feed servo enhancer circuit of FIG. 3.

An analysis of relationship two above utilizing the Bode method yields a graphical representation similar to that depicted in FIG. 4. It may be noted that the Bode analysis of forward feed servo enhancer 39, as illustrated in FIG. 4, indicates that there are corner frequencies at approximately three hertz, one hundred three hertz, and one hundred seventeen hertz. In addition, it may be noted that for frequencies less than three hertz, forward feed servo enhancer 39 has a rate of gain of twenty decibels per decade.

At this time, it may be noteworthy to mention that the subject invention is utilized in an aircraft training simulator which is designed to simulate flight conditions so as to allow for the training of pilots in the use of particular aircraft. Projector 29 provides a visual image such that a pilot utilizing the aforementioned aircraft training simulator can perform simulated flight maneuvers. Digital computer 13, in response to the simulated flight maneuvers performed by the above mentioned pilot, will provide digital command signals at a rate not exceeding three hertz.

Referring to FIGS. 2, 3 and 4, forward feed servo enhancer 39, in response to a command signal provided by digital computer 13 will generate a forward feed enhancement signal, the gain of which is twenty decibels per decade below three hertz. The forward feed enhancement signal is then supplied to summing junction 41 and combined with the command signal provided by digital computer 13. The combined signal formed by summing junction 41 is, in turn, amplified by amplifier 25 so as to provide at the output thereof a motor drive signal. The aforementioned motor drive signal then activates motor 27, thereby rotating the shaft thereof so as to cause projector 29 to rotate to a predetermined position.

As discussed previously, position potentiometer 33, in response to the rotational movement of the shaft of motor 27, produces at the output thereof an electrical signal which is indicative of the actual position of the shaft of motor 27, and thus the actual position of projector 29. The electrical signal provided by potentiometer 33 is amplified by amplifier 37 and then supplied to summing junction 17. Summing junction 17, as discussed previously, will provide a position error signal proportional to the difference between the programmed position of projector 29, as indicated by the command signal provided by digital computer 13, and the actual position of projector 29, as indicated by the electrical signal provided by position potentiometer 33. Summing junction 17, as discussed previously, will continue to provide a position error signal until the voltage level of the command signal is equal to the voltage level of the electrical signal provided by potentiometer 33, thereby reducing the voltage level of the position error signal to zero volts. This, in turn, inactivates motor 27 until an additional command signal is provided by digital computer 13.

Tachometer 31, as discussed previously, produces an electrical signal indicative of the actual velocity of projector 29. The electrical signal produced by tachometer 31 is supplied to amplifier 35 which amplifies the aforementioned electrical signal, and then supplies the amplified electrical signal to summing junction 21. Summing junction 21, in turn, provides a velocity error signal, the magnitude of which is approximately zero volts. As discussed previously, forward feed servo enhancer 39 generates a forward feed enhancement signal having a twenty decibel per decade gain below three hertz. The forward feed enhancement signal is then combined with the command signal provided by computer 13 at summing junction 41 so as to drive motor 27 such that the actual velocity of projector 29 is approximately equal to the programmed velocity, thereof, thereby reducing the velocity error signal to the aforementioned value of approximately zero volts. However, because the velocity error signal provided by summing junction 21 is still slightly above zero volts, the shaft of motor 27 will continue to rotate until projector 29 reaches the predetermined position as determined by the command signal provided by digital computer 13.

Figure 5:
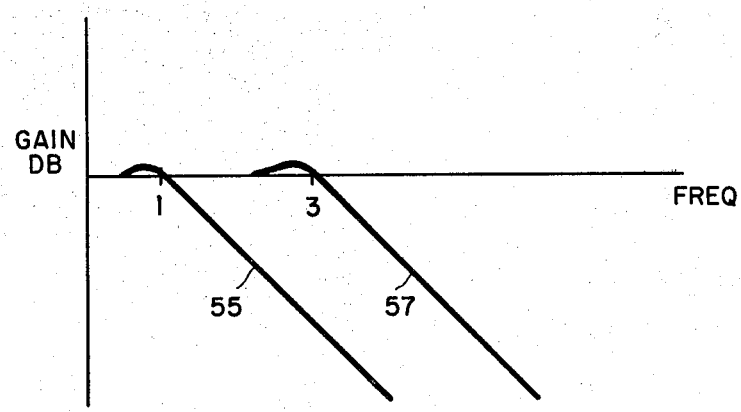
FIG. 5 depicts an idealized representation of the closed loop gain of the servo control system of FIG. 1 and the servo control system of FIG. 2.

Referring now to FIGS. 1, 2 and 5, there is shown an idealized representation of the gain of servo control system 11, generally depicted by a solid line 55, and the servo control system of FIG. 2, generally depicted by a solid line 57. As depicted by solid line 55, servo control system 11 has a gain of approximately one for frequencies less than one hertz, and is not responsive to frequencies greater than one hertz. This, in turn, indicates that servo control system 11, and thus projector 29 is responsive only to command signals provided by digital computer 13 at frequencies less than one hertz.

However, as discussed previously, digital computer 13 provides at the output thereof command signals at rates of up to three hertz. Forward feed servo enhancer 39, as depicted by solid line 57, provides for a gain of approximately one at frequencies up to three hertz. This, in turn, insures that servo control system 38 is responsive to each command signal provided by digital computer 13. Thus, forward feed servo enhancer 39 stabilizes servo control system 38 such that projector 29 will present to the aforementioned pilot an accurate visual image so as to simulate a realistic training environment.

Referring now to FIGS. 2 and 4, the Bode plot of FIG. 4 shows that a corner frequency occurs at three hertz, and that for frequencies above three hertz, the gain of forward feed servo enhancer 39 remains constant or decreases in value. This, in turn, minimizes the effects of noise upon the subject invention since forward feed servo enhancer 39 will not significantly amplify noise signals above three hertz. Thus, servo control system 39 will provide the above mentioned pilot with an accurate visual image so as to simulate a realistic training environment.

From the foregoing, it may readily be seen that the subject invention comprises a new, unique, and exceedingly useful servo control system for the positioning of an apparatus which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. A servo control system for the positioning of an apparatus comprising, in combination:

a direct current motor having an input and a shaft, the shaft of said direct current motor having said apparatus connected thereto;

computing means having an output for generating a plurality of digital command signals, each of which is determinative of a predetermined programmed position in an azimuthal direction to which said apparatus will be moved by said motor at a programmed velocity within a predetermined time period;

means having an input connected to the output of said computing means, and an output for converting each of said digital command signals to an analog command signal proportional thereto;

means having an input effectively connected to the output of said converting means, and an output connected to the input of said direct current motor for amplifying each of said analog command signals so as to effect the activation of said direct current motor such that the shaft thereof will rotationally move said apparatus to each programmed position as determined by the digital command signals generated by said computing means;

potentiometer means effectively connected to the shaft of said direct current motor and having an output for producing at the output thereof an electrical signal indicative of the actual position of said apparatus;

tachometer means effectively connected to the shaft of said direct current motor and having an output for producing at the output thereof an electrical signal indicative of the actual velocity of said apparatus;

means having an input connected to the output of said converting means and an output for generating a forward feed enhancement signal in response to each of said analog command signals; and feedback means effectively connected between the output of said converting means and the input of said amplifying means, said feedback means having first, second, and third inputs, the first of which is connected to the output of said potentiometer means, the second of which is connected to the output of said tachometer means, and the third of which is connected to the output of said generating means; for providing, in response to the electrical signal produced by said potentiometer means, a position error signal proportional to the difference between the predetermined programmed position of said apparatus and the actual position of said apparatus, for providing, in response to the electrical signal produced by said tachometer means, a velocity error signal proportional to the difference between the programmed velocity of said apparatus and the actual velocity of said apparatus, for varying, in response to said position error signal and said velocity error signal the voltage level of each of said analog command signals so as to cause the rotational velocity of the shaft of said direct current motor to vary such that said apparatus will attain each predetermined program position within said predetermined time periods, and for combining said forward feed enhancement signal with each of said analog command signals so as to reduce said velocity error signal to a predetermined voltage level such that said servo control system will respond to digital command signals provided by said computing means at frequencies not to exceed a predetermined frequency rate.

2. The servo control system of claim 1 wherein said apparatus comprises a projector.

3. The servo control system of claim 1 wherein said computing means comprises a digital computer.

4. The servo control system of claim 1 wherein said generating means comprises:

a first capacitor having first and second terminals, the first terminal of which is connected to the output of said converting means;

a first resistor having first and second terminals, the first terminal of which is connected to the second terminal of said first capacitor;

an operational amplifier having an input connected to the second terminal of said first resistor, and an output connected to the third input of said feedback means;

a second resistor having first and second terminals, the first terminal of which is connected to the second terminal of said first resistor, and the second terminal of which is connected to the output of said operational amplifier;

a third resistor having first and second terminals, the first terminal of which is connected to the second terminal of said first resistor;

a second capacitor having first and second terminals, the first terminal of which is connected to the second terminal of said third resistor, and the second terminal of which is connected to the output of said operational amplifier.

5. The servo control of claim 4 wherein said generating means comprises a forward feed servo enhancer having a transfer function in accordance with the relationship:

$$P(s) = \frac{R_2 (R_3 C_2 S + 1) C_1 S}{[(R_2 + R_3) C_2 S + 1][R_1 C_1 S + 1]}$$

where

P(s) is the transfer function of said generating means,
$R_1$ is said first resistor,
$R_2$ is said second resistor,
$R_3$ is said third resistor,
$C_1$ is said first capacitor,
$C_2$ is said second capacitor, and
S is a frequency rate at which said digital command signals are provided by said computing means.

6. The servo control system of claim 1 wherein said feedback means comprises:
- a first summing junction connected to the output of said converting means and the output of said potentiometer means;
- a position loop compensator having an input connected to said first summing junction and an output;
- a second summing junction connected to the output of said position loop compensator and the output of said tachometer means;
- a rate loop compensator having an input connected to said second summing junction and an output; and
- a third summing junction connected to the output of said rate loop compensator, and the output of said generating means.

7. The servo control system of claim 1 wherein said predetermined frequency rate is three hertz.

8. A motion control system for the positioning of an apparatus comprising, in combination:
- a digital-to-analog converter having an input and an output;
- a first summing junction connected to the output of said digital-to-analog converter;
- a position loop compensator having an input connected to said first summing junction and an output;
- a second summing junction connected to the output of said position loop compensator;
- a rate loop compensator having an input connected to said second summing junction and an output;
- a third summing junction connected to the output of said rate loop compensator;
- a first capacitor having first and second terminals, the first terminal of which is connected to the output of said digital to analog converter;
- a first resistor having first and second terminals, the first terminal of which is connected to the second terminal of said first capacitor;
- an operational amplifier having an input connected to the second terminal of said first resistor, and an output connected to said third summing junction;
- a second resistor having first and second terminals, the first terminal of which is connected to the second terminal of said first resistor; and the second terminal of which is connected to the output of said operational amplifier;
- a third resistor having first and second terminals, the first terminal of which is connected to the second terminal of said first resistor;
- a second capacitor having first and second terminals, the first terminal of which is connected to the second terminal of said third resistor, and the second terminal of which is connected to the output of said operational amplifier;
- a power amplifier having an input connected to said third summing junction and an output;
- a direct current motor having a shaft, and an output connected to the input of said power amplifier;
- a tachometer connected to the shaft of said direct current motor, said tachometer having an output;
- a first linear amplifier having an input connected to the output of said tachometer and an output connected to said second summing junction;
- a position potentiometer connected to the shaft of said direct current motor, said position potentiometer having an output; and
- a second linear amplifier having an input connected to the output of said position potentiometer and an output connected to said first summing junction.

9. The motion control system of claim 8 further characterized by a digital computer having an output connected to the input of said digital-to-analog converter.

10. The motion control system of claim 8 further characterized by a projector effectively connected to the shaft of said motor.

* * * * *